United States Patent
Roberts et al.

(10) Patent No.: US 8,887,068 B2
(45) Date of Patent: Nov. 11, 2014

(54) METHODS AND SYSTEMS FOR VISUALLY CHRONICLING A CONFERENCE SESSION

(75) Inventors: Brian F. Roberts, Dallas, TX (US); Donald H. Relyea, Dallas, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 1005 days.

(21) Appl. No.: 12/533,092

(22) Filed: Jul. 31, 2009

(65) Prior Publication Data
US 2011/0029893 A1    Feb. 3, 2011

(51) Int. Cl.
G06F 3/01    (2006.01)
G06F 3/048    (2013.01)

(52) U.S. Cl.
USPC ............................ 715/753; 715/757; 715/758

(58) Field of Classification Search
USPC .......................................... 715/753, 759, 758
See application file for complete search history.

(56) References Cited

U.S. PATENT DOCUMENTS

| | | | |
|---|---|---|---|
| 2003/0046350 A1* | 3/2003 | Chintalapati et al. | 709/206 |
| 2007/0070066 A1* | 3/2007 | Bakhash | 345/419 |
| 2009/0249223 A1* | 10/2009 | Barsook et al. | 715/753 |

OTHER PUBLICATIONS

"Social TV: Watch Hulu with Your Facebook and MySpace Friends" by Ben Parr Apr. 18, 2009.*

* cited by examiner

*Primary Examiner* — Steven B. Theriault
*Assistant Examiner* — Peiyong Weng

(57) ABSTRACT

An exemplary method includes displaying an interactive collaboration plane along a time axis within a graphical user interface, automatically detecting a plurality of participation events each performed by one of a plurality of participants during a conference session between the plurality of participants, recording a time of occurrence of each of the participation events, and displaying graphical depictions of the participation events within the interactive collaboration plane. The graphical depictions are positioned along the time axis in accordance with the recorded times of occurrence of the participation events. Corresponding methods and systems are also disclosed.

17 Claims, 15 Drawing Sheets

METHODS AND SYSTEMS FOR VISUALLY CHRONICLING A CONFERENCE SESSION

BACKGROUND INFORMATION

In-person meetings, conference calls, video conference sessions, and other such conference sessions are often used to share new ideas, provide instructions, make deals, or otherwise disseminate information among participants thereof. It is often difficult, however, for the participants to accurately remember the events that transpire in such meetings. For example, it is often difficult for the participants to accurately recall how each participant contributed to or otherwise participated in a conference session.

Video and audio recording capabilities have alleviated these difficulties to some degree by providing participants with the capability of reviewing video and/or audio streams of a completed conference session. However, review of such recordings is often time consuming and cumbersome. Moreover, such recordings do not provide users with the capability of visualizing how each participant contributes to or otherwise participates in a conference session.

BRIEF DESCRIPTION OF THE DRAWINGS

The accompanying drawings illustrate various embodiments and are a part of the specification. The illustrated embodiments are merely examples and do not limit the scope of the disclosure. Throughout the drawings, identical or similar reference numbers designate identical or similar elements.

DETAILED DESCRIPTION OF PREFERRED EMBODIMENTS

Exemplary methods and systems for visually chronicling a conference session are described herein. As described in more detail below, a display facility may display an interactive collaboration plane along a time axis within a graphical user interface. A detection facility may automatically detect a plurality of participation events each performed by one of a plurality of participants during a conference session between the plurality of participants and record a time of occurrence of each of the participation events. The display facility may display graphical depictions of the participation events within the interactive collaboration plane. Each graphical depiction may include one or more graphical objects representative of a corresponding participation event and may be positioned along the time axis at a location corresponding to the time of occurrence of the corresponding participation event. In this manner, as will be described in more detail below, a viewer of the graphical user interface (e.g., one or more of the participants of the conference session and/or one or more other users) may see how the conference session evolves over time and/or how each participant contributes to or otherwise participates in the conference session.

As used herein, the term "conference session" refers to a phone conference session, a video conference session, an in-person meeting, and/or any other type of communication between multiple participants that relies at least in part on voice communications between the participants. A conference session may begin at a designated start time and end when the participants therein so desire. In some instances, one or more intervening events may interrupt a conference session. Hence, a conference session does not have to include a continuous time period. However, in the examples described herein, a conference session will be assumed to include a continuous time period for illustrative purposes only.

Figure 1:
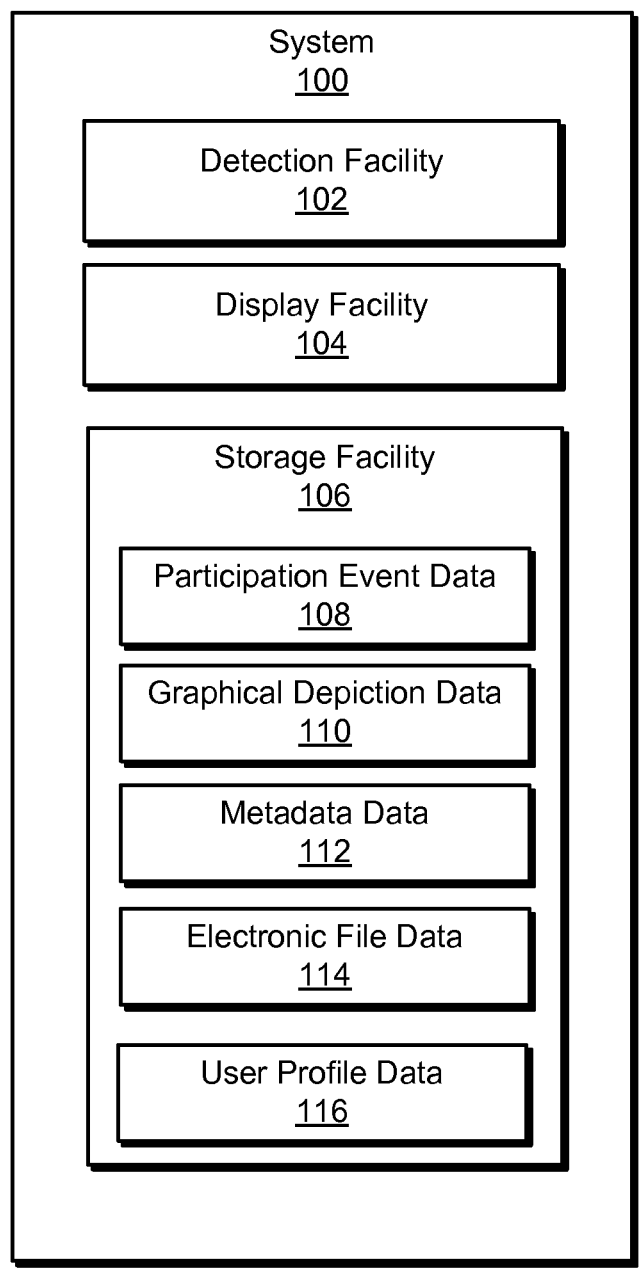
FIG. 1 illustrates an exemplary system for visually chronicling a conference session according to principles described herein.

FIG. 1 illustrates an exemplary system 100 for visually chronicling a conference session. As will be described in more detail below, system 100 may be configured to visually chronicle a conference session by detecting an occurrence of one or more participation events performed by one or more participants in the conference session and displaying graphical depictions of the participation events in an interactive collaboration plane that is disposed within a graphical user interface. To this end, system 100 may include, but is not limited to, a detection facility 102, a display facility 104, and a storage facility 106 selectively and communicatively coupled one to another.

Detection facility 102 may be configured to automatically detect a plurality of participation events each performed by one of a plurality of participants during a conference session between the participants. As used herein, a "participation event" may include, but is not limited to, a verbal communication spoken by one of the participants, an uploading of an electronic file by one of the participants for access by one or more of the participants, a behavioral action performed by one of the participants, an inputting of a textual note by one of the participants, a joining of the conference session by one of the participants, an exiting of the conference session by one of the participants, and/or any other action performed by one or more of the participants during a conference session. Exemplary ways in which detection facility 102 may automatically detect a participation event will be described in more detail below.

Detection facility 102 may be further configured to detect and record a time of occurrence of each of the detected participation events. For example, detection facility 102 may record a timestamp within metadata associated with each participation event. As used herein, the term "metadata" refers generally to any electronic data descriptive of a participation event, media content instance, user profile, and/or anything else associated with a conference session.

Display facility 104 may be configured to display an interactive collaboration plane along a time axis within a graphical user interface and display a graphical depiction of each of the participation events detected by detection facility 102 within the interactive collaboration plane. Exemplary interaction collaboration planes will be described in more detail below. In some examples, display facility 104 may be configured to position the graphical depictions along the time axis in accordance with the recorded times of occurrence of the detected participation events. In this manner, the graphical depictions visually chronicle the conference session, as will be described in more detail below.

As shown in FIG. 1, storage facility 106 may be configured to maintain participation event data 108 representative of one or more participation events detected by detection facility 102, graphical depiction data 110 representative of one or more graphical depictions of participation events, metadata data 112 representative of one or more metadata values associated with one or more participation events, electronic file data 114 representative of one or more electronic files, and user profile data 116 representative of one or more user profiles of one or more participants in a conference session. Data 108-116 will be described in more detail below.

System 100, including detection facility 102, display facility 104, and storage facility 106, may include any computer hardware and/or computer-implemented instructions (e.g., software), or combinations of computer-implemented instructions and hardware, configured to perform one or more of the processes described herein. In particular, system 100 may be implemented on one physical computing device or may be implemented on more than one physical computing device. Accordingly, system 100 may include any number of computing devices, and may employ any of a number of computer operating systems.

One or more of the processes described herein may be implemented at least in part as instructions executable by one or more computing devices. In general, a processor (e.g., a microprocessor) receives instructions, from a computer-readable medium, (e.g., a memory, etc.), and executes those instructions, thereby performing one or more processes, including one or more of the processes described herein. Such instructions may be stored and/or transmitted using any of a variety of known computer-readable media.

A computer-readable medium (also referred to as a processor-readable medium) includes any medium that participates in providing data (e.g., instructions) that may be read by a computer (e.g., by a processor of a computer). Such a medium may take many forms, including, but not limited to, non-volatile media and/or volatile media. Non-volatile media may include, for example, optical or magnetic disks and other persistent memory. Volatile media may include, for example, dynamic random access memory ("DRAM"), which typically constitutes a main memory. Common forms of computer-readable media include, for example, a floppy disk, flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

Figure 2:
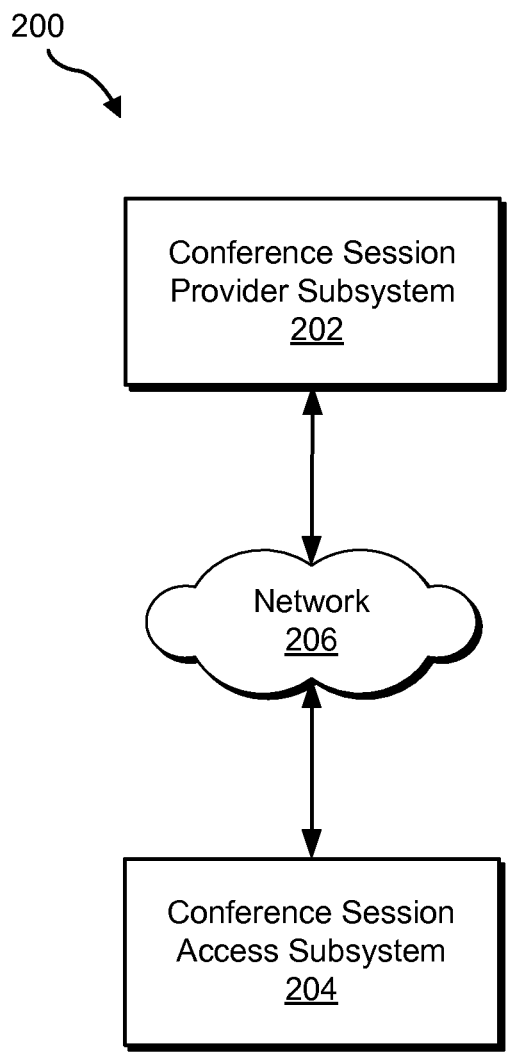
FIG. 2 illustrates an exemplary implementation of the system of FIG. 1 according to principles described herein.

FIG. 2 illustrates an exemplary implementation 200 of system 100 wherein a conference session provider subsystem 202 (or simply "provider subsystem 202") is communicatively coupled to a conference session access subsystem 204 (or simply "access subsystem 204"). As will be described in more detail below, detection facility 102, display facility 104, and storage facility 106 may each be implemented on one or both of provider subsystem 202 and access subsystem 204.

Provider subsystem 202 may provide one or more services that facilitate a conference session between a plurality of participants. For example, provider subsystem 202 may include one or more components configured to provide services for a phone conference session, a video conference session, an in-person meeting, and/or any other type of communication between multiple participants that relies at least in part on voice communications between the participants. Exemplary implementations of provider subsystem 202 will be described in more detail below.

Access subsystem 204 may be configured to communicate with provider subsystem 202 and facilitate user participation in a conference session provided by provider subsystem 202. Exemplary implementations of access subsystem 204 will be described in more detail below.

Access subsystem 204 and provider subsystem 202 may communicate using any suitable communication technologies, devices, networks, network platforms, media, and protocols supportive of remote data communications. For example, as shown in FIG. 2, provider subsystem 202 may be configured to communicate with access subsystem 204 over a network 206 (and communications links thereto). Network 206 may include one or more networks or types of networks capable of carrying communications and/or data signals between provider subsystem 202 and access subsystem 204. For example, network 206 may include, but is not limited to, a cable network, an optical fiber network, a hybrid fiber coax network, a wireless network (e.g., a Wi-Fi and/or mobile telephone network), a satellite network, a wireless broadcast network (e.g., a satellite media broadcasting network or a terrestrial broadcasting network), a subscriber television network, a provider-specific network (e.g., a Verizon® FIOS® network), the Internet, an intranet, a local area network, any other suitable network, and any combination or sub-combination of these networks.

Provider subsystem 202 and access subsystem 204 may communicate over network 206 using any suitable communication technologies, devices, media, and protocols supportive of remote data communications, including, but not limited to, data transmission media, communications devices, Transmission Control Protocol ("TCP"), Internet Protocol ("IP"), File Transfer Protocol ("FTP"), Telnet, Hypertext Transfer Protocol ("HTTP"), Real Time Protocol ("RTP"), User Datagram Protocol ("UDP"), Ethernet, and any other suitable communications technologies, devices, media, and protocols.

While FIG. 2 shows provider subsystem 202 and access subsystem 204 communicatively coupled via network 206, it will be recognized that provider subsystem 202 and access subsystem 204 may be configured to communicate one with another in any other suitable manner (e.g., via a direct connection). Moreover, it will be recognized that in some examples, system 100 may be implemented entirely on access subsystem 204.

Figure 3:
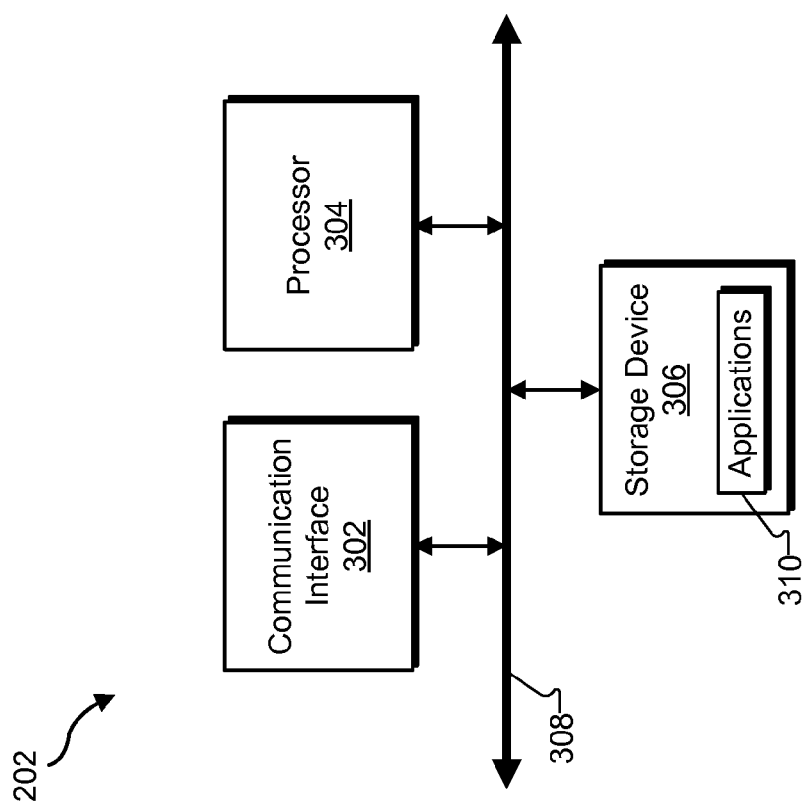
FIG. 3 illustrates exemplary components of a conference session provider subsystem according to principles described herein.

FIG. 3 illustrates exemplary components of provider subsystem 202. As shown in FIG. 3, provider subsystem 202 may include a communication interface 302, a processor 304, and a storage device 306 communicatively coupled one to another via a communication infrastructure 308. The components of provider subsystem 202 may communicate with one another, including sending data to and receiving data from one another, using any suitable communication technologies. Moreover, the components of provider subsystem 202 may be implemented on any computing device or combination of computing devices, such as one or more servers, personal computers, or the like.

While an exemplary provider subsystem 202 is shown in FIG. 3, the components illustrated in FIG. 3 are not intended to be limiting. Additional or alternative components may be used in other embodiments. Components of the provider subsystem 202 shown in FIG. 3 will now be described in additional detail.

Communication interface 302 may be configured to communicate with one or more computing devices, including access subsystem 204. In particular, communication interface 302 may be configured to transmit and/or receive communication signals, media content, and/or data to/from access subsystem 204. Examples of communication interface 302 include, without limitation, a wired network interface (such as a network interface card), a wireless network interface (such as a wireless network interface card), a modem, and any other suitable interface. In at least one embodiment, communication interface 302 may provide a direct connection between provider subsystem 202 and access subsystem 204 via a direct link to a network, such as the Internet. Communication interface 302 may additionally or alternatively provide such a connection through, for example, a local area network (such as an Ethernet network), a personal area network, a telephone or cable network, a cellular telephone connection, a satellite data connection, a dedicated uniform resource locator ("URL"), or any other suitable connection.

In some examples, communication interface 302 may be configured to transmit data (e.g., participation event data 108, graphical depiction data 110, metadata data 112, electronic file data 114, and/or user profile data 116) to access subsystem 204. Such data may be transmitted in one or more data streams, as one or more data files, or in any other suitable manner as may serve a particular application. Communication interface 302 may be configured to interface with any suitable communication media, protocols, and formats, including any of those mentioned above.

Processor 304 generally represents any type or form of processing unit capable of processing data or interpreting, executing, and/or directing execution of one or more of the instructions, processes, and/or operations described herein. Processor 304 may direct execution of operations in accordance with one or more applications 310 or other computer-executable instructions such as may be stored in storage device 306 or another computer-readable medium. As an example, processor 304 may be configured to process data, including modulating, encoding, and/or otherwise preparing data for transmission by communication interface 302.

Storage device 306 may include one or more data storage media, devices, or configurations and may employ any type, form, and combination of data storage media and/or device. For example, storage device 306 may include, but is not limited to, a hard drive, network drive, flash drive, magnetic disc, optical disc, random access memory ("RAM"), dynamic RAM ("DRAM"), other non-volatile and/or volatile data storage units, or a combination or sub-combination thereof. Electronic data, including data described herein, may be temporarily and/or permanently stored in storage device 306. For example, data representative of one or more executable applications 310 configured to direct processor 304 to perform any of the operations described herein may be stored within storage device 306. In some examples, data may be arranged in one or more databases residing within storage device 306.

In some examples, detection facility 102, display facility 104, and/or storage facility 106 may be implemented by or within one or more components of provider subsystem 202. For example, one or more applications 310 residing within storage device 306 may be configured to direct processor 304 to perform one or more processes or functions associated with detection facility 102 and/or display facility 104. Likewise, storage facility 106 may be implemented by or within storage device 306. For example, participation event data 108, graphical depiction data 110, metadata data 112, electronic file data 114, and/or user profile data 116 may be stored within storage device 306.

Figure 4:
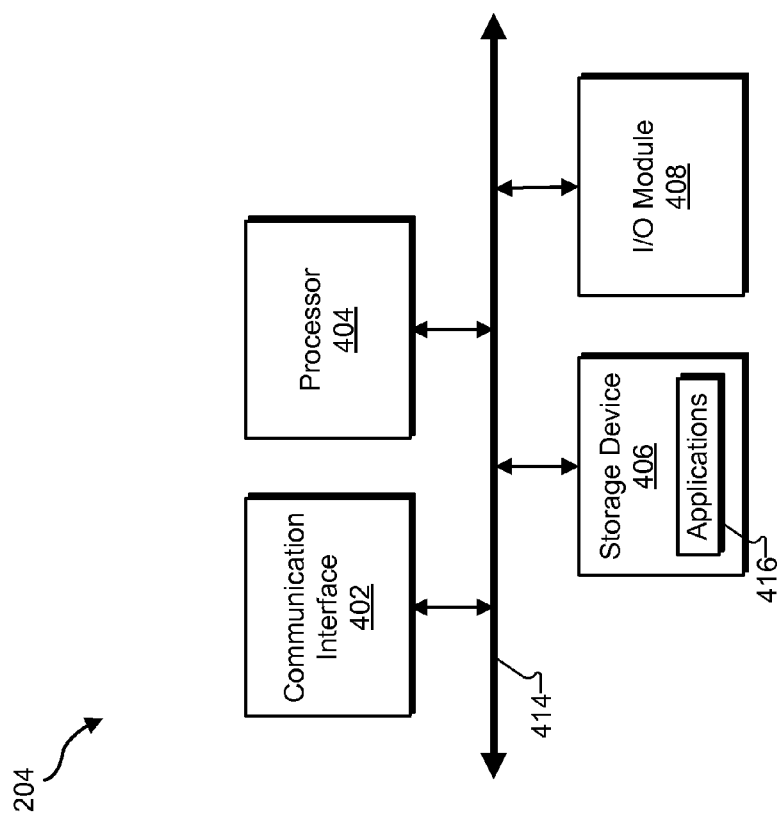
FIG. 4 illustrates exemplary components of a conference session access subsystem according to principles described herein.

FIG. 4 illustrates exemplary components of access subsystem 204. As shown in FIG. 4, access subsystem 204 may include a communication interface 402, a processor 404, a storage device 406, and an input/output ("I/O") module 408 communicatively coupled one to another via a communication infrastructure 414. The components of access subsystem 204 may communicate with one another, including sending data to and receiving data from one another, using any suitable communication technologies. Moreover, the components of access subsystem 204 may be implemented on any computing device or combination of computing devices, such as a personal computer, a set-top box, a media content processing device, a communications device, an audio file player device, a mobile device (e.g., a mobile phone device), a handheld device, a phone device (e.g., Verizon Hub device), a personal-digital assistant device, a gaming device, a television device, and/or any conference session access device configured to perform one or more of the processes and/or operations described herein.

While an exemplary access subsystem 204 is shown in FIG. 4, the components illustrated in FIG. 4 are not intended to be limiting. Additional or alternative components may be used in other embodiments. Components of the access subsystem 204 shown in FIG. 4 will now be described in additional detail.

Communication interface 402 may be configured to communicate with one or more computing devices, including provider subsystem 202. In particular, communication interface 402 may be configured to transmit and/or receive communication signals, media content, and/or data to/from provider subsystem 202. Examples of communication interface 402 include, without limitation, a wired network interface (such as a network interface card), a wireless network interface (such as a wireless network interface card), a modem, and any other suitable interface. In at least one embodiment, communication interface 402 may provide a direct connection between provider subsystem 202 and access subsystem 204 via a direct link to a network, such as the Internet. Communication interface 402 may additionally or alternatively provide such a connection through, for example, a local area network (such as an Ethernet network), a personal area network, a telephone or cable network, a cellular telephone connection, a satellite data connection, a dedicated URL, or any other suitable connection.

As mentioned, provider subsystem 202 may transmit data (e.g., participation event data 108, graphical depiction data 110, metadata data 112, electronic file data 114, and/or user profile data 116) to access subsystem 204. Communication interface 402 may be configured to receive such data such that the data may be processed by access subsystem 204. Communication interface 402 may be configured to interface with any suitable communication media, protocols, and formats, including any of those mentioned above.

Processor 404 generally represents any type or form of processing unit capable of processing data or interpreting, executing, and/or directing execution of one or more of the instructions, processes, and/or operations described herein. Processor 404 may direct execution of operations in accordance with one or more applications 416 or other computer-executable instructions such as may be stored in storage device 406 or another computer-readable medium. As an example, processor 404 may be configured to process data, including demodulating, decoding, and/or parsing data received from provider subsystem 202 by communication interface 402, and encoding and modulating data for transmission by communication interface 402.

Storage device 406 may include one or more data storage media, devices, or configurations and may employ any type, form, and combination of data storage media and/or device. For example, storage device 406 may include, but is not limited to, a hard drive, network drive, flash drive, magnetic disc, optical disc, random access memory ("RAM"), dynamic RAM ("DRAM"), other non-volatile and/or volatile data storage units, or a combination or sub-combination thereof. Electronic data, including data described herein, may be temporarily and/or permanently stored in storage device 406. For example, data representative of one or more executable applications 416 configured to direct processor 404 to perform any of the operations described herein may be stored within storage device 406. In some examples, data may be arranged in one or more databases residing within storage device 406.

I/O module 408 may be configured to receive user input and provide user output and may include any hardware, firmware, software, or combination thereof supportive of input and output capabilities. For example, I/O module 408 may include hardware and/or software for capturing user input, including, but not limited to, a microphone, a video camera, speech recognition software, a keyboard or keypad, a touch screen component (e.g., touch screen display), a motion detection component, an image and/or object detection component (e.g., a facial recognition component), a receiver (e.g., an RF or infrared receiver), and/or one or more input buttons.

I/O module 408 may include one or more devices for presenting output to a user, including, but not limited to, a graphics engine, a display (e.g., a display screen, one or more output drivers (e.g., display drivers), one or more audio speakers, and one or more audio drivers. In certain embodiments, I/O module 408 is configured to provide graphical data to a display for presentation to a user. The graphical data may representative of one or more graphical user interfaces ("GUIs"), GUI views, media content views, and/or any other view as may serve a particular application.

In some examples, detection facility 102, display facility 104, and/or storage facility 106 may be implemented by or within one or more components of access subsystem 204. For example, one or more applications 416 residing within storage device 406 may be configured to direct processor 404 to perform one or more processes or functions associated with detection facility 102 and/or display facility 104. Likewise, storage facility 106 may be implemented by or within storage device 406. For example, participation event data 108, graphical depiction data 110, metadata data 112, electronic file data 114, and/or user profile data 116 may be stored within storage device 406.

Figure 5:
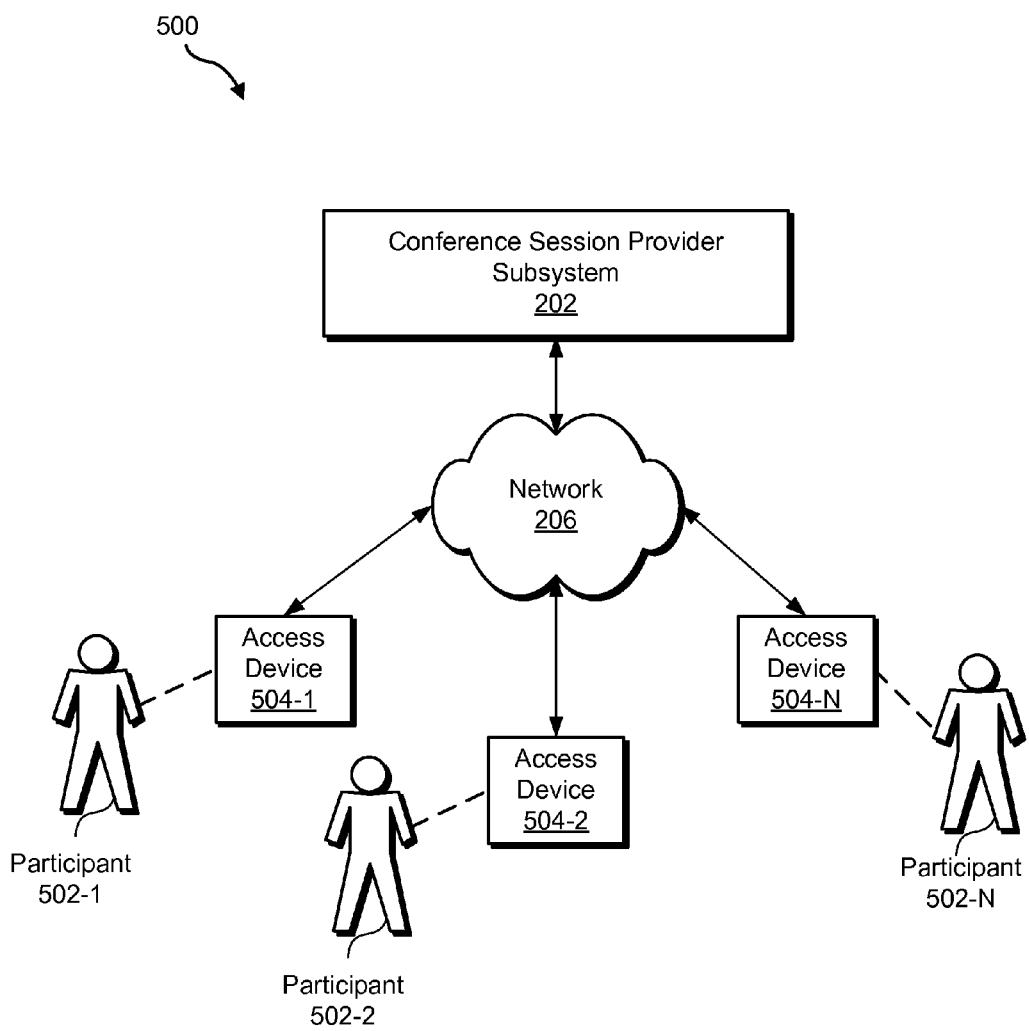
FIG. 5 shows an exemplary implementation of the system of FIG. 1 according to principles described herein.

System 100 may be configured to support interaction between multiple participants. For example, FIG. 5 shows an exemplary implementation 500 of system 100 wherein multiple participants 502-1 through 502-N (collectively referred to herein as "participants 502") may utilize one or more access devices 504 (e.g., access devices 504-1 through 504-N) to communicate with provider subsystem 202 over network 206. As will be described in more detail below, each of the access devices 504 may be configured to concurrently display an interactive collaboration plane corresponding to a conference session of which participants 502 are a part. In this manner, each participant 502 may view how the conference session evolves over time.

In some examples, one or more participants 502 may utilize one or more applications residing within provider subsystem 202 and/or an access device 504 in order to participate in a conference session. The one or more applications may be included within applications 310 and/or applications 416, for example, and may be executed by any computing device implementing or included within provider subsystem 202 and/or access subsystem 204. Exemplary applications that may be utilized by a participant to participate in a conference session include, but are not limited to, phone conference applications, video conference applications, webinar applications, media content presentation applications, content management applications, Web applications, Web browsers, telephone applications, e-mail applications, electronic file sharing applications, social networking applications, and/or any other application that facilitates participation in a conference session.

Additionally or alternatively, one or more participants 502 may participate in a conference session without directly accessing an application residing within provider subsystem 202 and/or an access device 504. For example, one or more participants 502 may participate in an in-person conference session. An exemplary in-person conference session may include, but is not limited to, an in-person meeting, a brainstorming session, a conference, a conversation, and/or any other event wherein participants 502 may speak one with another face to face.

It is often desirable to visually chronicle a conference session so that one or more participants thereof or other users may see how the conference session evolves over time and/or how each participant contributes to or otherwise participates in the conference session. To this end, the methods and systems described herein facilitate visual chronicling of a conference session. As will be described herein, such visual chronicling may be facilitated by automatically detecting a plurality of participation events each performed by one of a plurality of participants during a conference session between the participants. Graphical depictions of the participation events may be displayed within an interactive collaboration plane, which may be displayed along a time axis within a GUI accessible to one or more of the participants and/or to one or more other users. Each of the graphical depictions may be positioned along the time axis in accordance with a time of occurrence of each of the participation events. A participant or other user may view a portion of the interactive collaboration plane that corresponds to a desired time period to view graphical depictions of the participation events that occurred during that time period. In some examples, as will be described in more detail below, the participant or other user may select one or more of the graphical depictions to access additional information associated with the participation events that correspond to the one or more graphical depictions.

Figure 6:
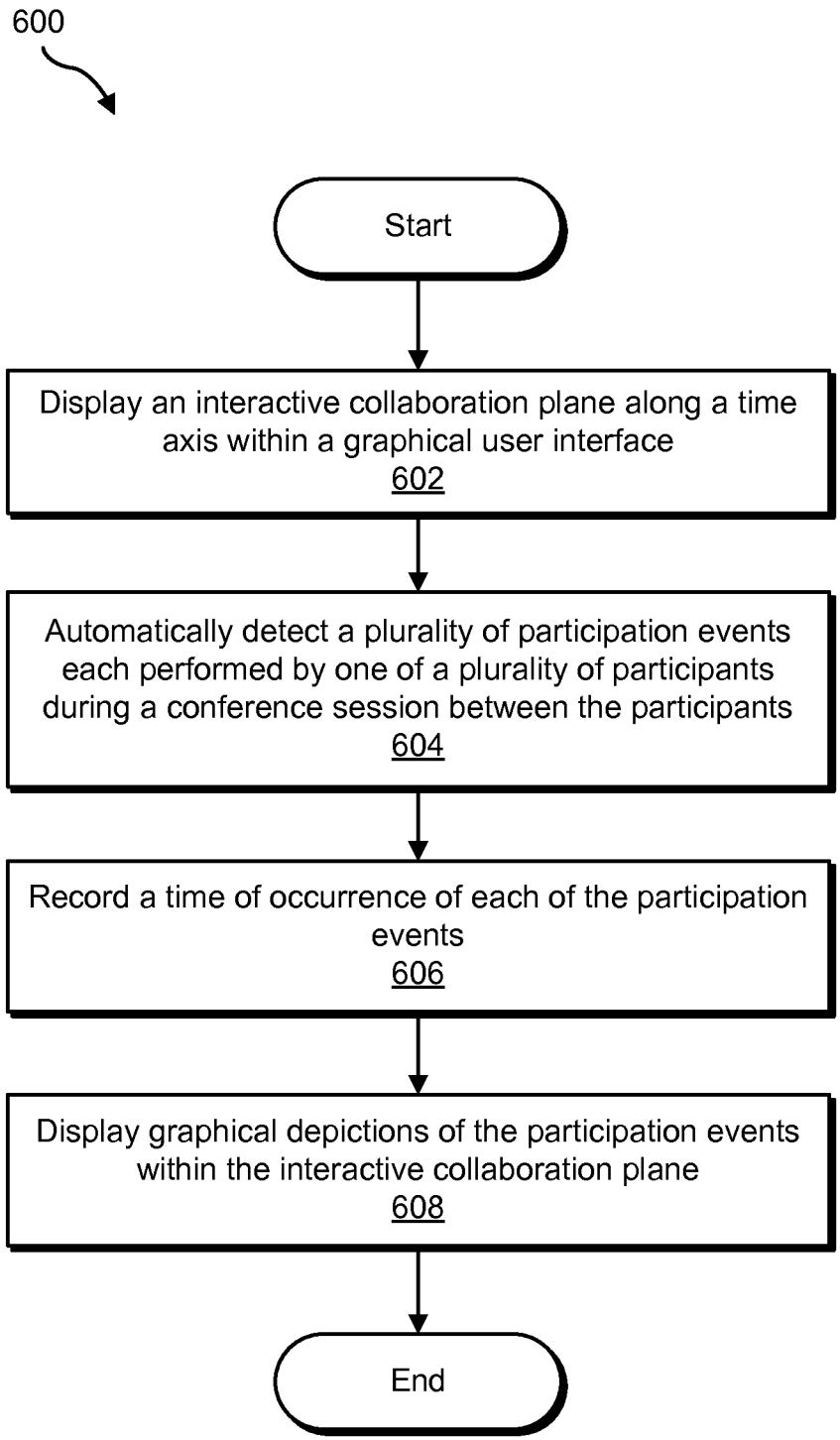
FIG. 6 illustrates an exemplary method of visually chronicling a conference session according to principles described herein.

FIG. 6 illustrates an exemplary method 600 of visually chronicling a conference session. While FIG. 6 illustrates exemplary steps according to one embodiment, other embodiments may omit, add to, reorder, and/or modify any of the steps shown in FIG. 6.

Figure 7:
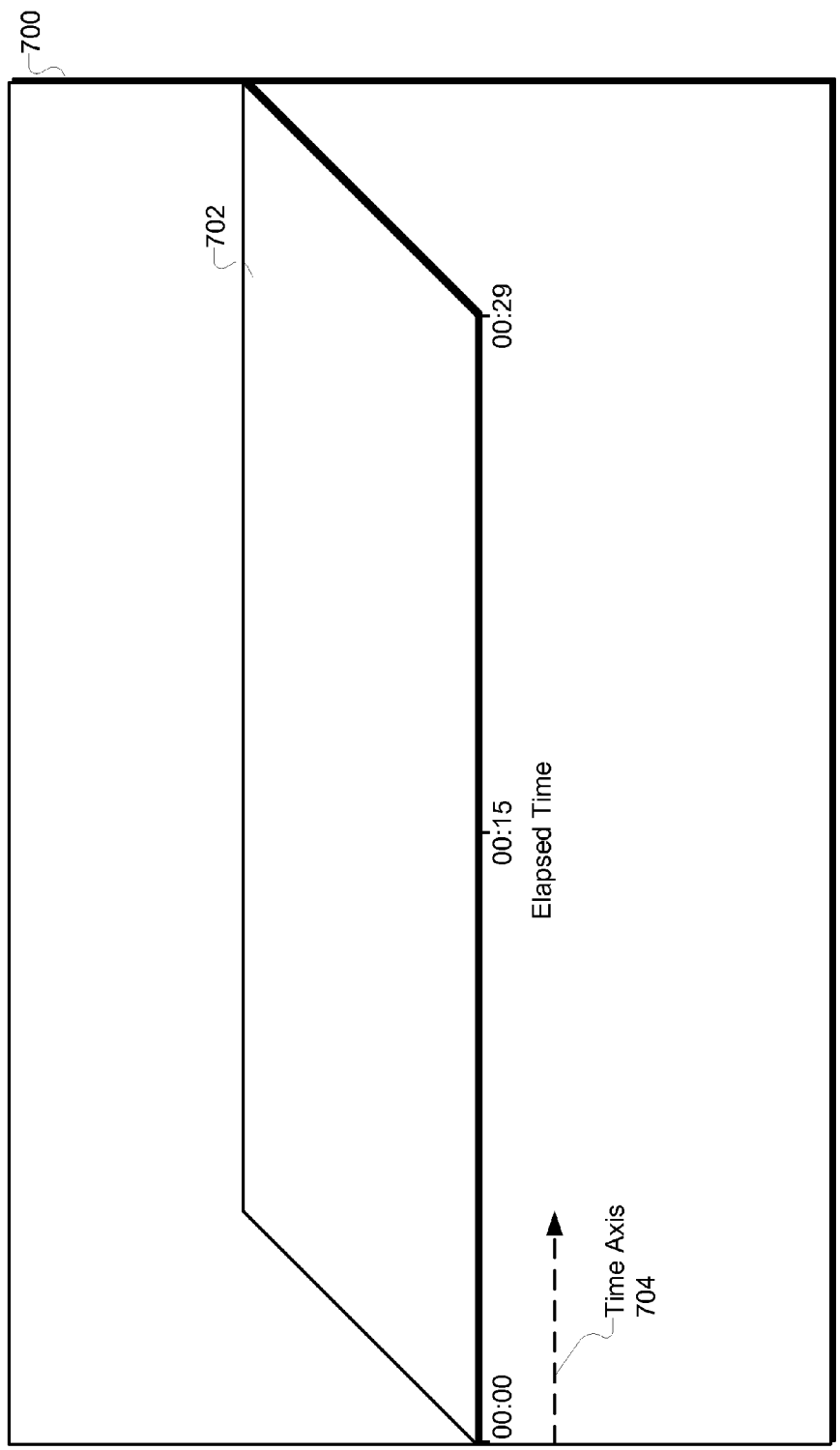
FIG. 7 illustrates an exemplary graphical user interface ("GUI") having an interactive collaboration plane displayed therein that may be presented to a viewer according to principles described herein.

In step 602, an interactive collaboration plane is displayed along a time axis within a graphical user interface. The interactive collaboration plane may be displayed by display facility 104. For example, FIG. 7 illustrates an exemplary GUI 700 that may be displayed by display facility 104 and presented to a viewer. As used herein, a "viewer" of GUI 700 may include a participant in a conference session or any other user (e.g., a supervisor of one of one or more of the participants, a relative of one or more of the participants, etc.).

As shown in FIG. 7, an interactive collaboration plane 702 may be displayed along a time axis 704 within GUI 700. Time axis 704 is represented in FIG. 7 by a dashed line and extends in a horizontal direction within GUI 700. Time axis 704 may alternatively extend in another direction (e.g., a vertical direction) within GUI 700 in some alternative embodiments. However, in the examples given herein, it will be assumed that time axis 704 extends in a horizontal direction.

As shown in FIG. 7, interactive collaboration plane 702 may be displayed in a three-dimensional view. In this manner, the amount of information displayed within interactive collaboration plane 702 may be maximized. Moreover, a three-dimensional interactive collaboration plane 702 may facilitate an aesthetically pleasing experience for a viewer of GUI 700. Alternatively, as will be described in more detail below, interactive collaboration plane 702 may be displayed within GUI 702 in a two-dimensional view.

Interactive collaboration plane 702 is "interactive" in that a viewer thereof may interact with interactive collaboration plane 702 and/or one or more graphical depictions displayed therein in order to access information corresponding to participation events that occur during a conference session.

Figure 8:
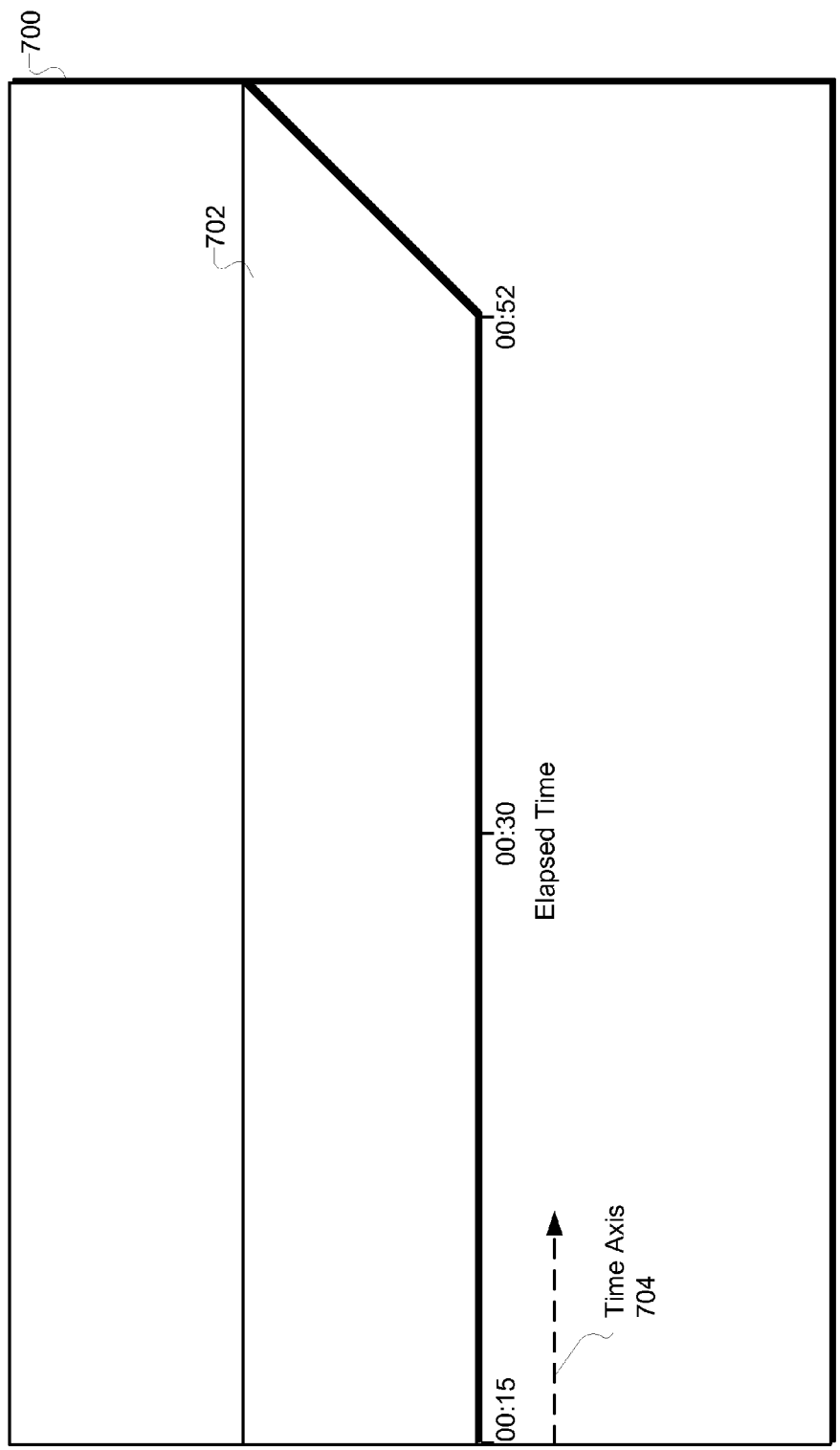
FIG. 8 illustrates how the interactive collaboration plane of FIG. 7 may increase in length to represent an increase in the amount of elapsed time of a conference session according to principles described herein.

In some examples, interactive collaboration plane 702 may be configured to dynamically increase in length along time access 704 as time elapses during a conference session. To illustrate, the length of interactive collaboration plane 702 shown in FIG. 7 corresponds to a conference session having an elapsed time of 29 seconds. FIG. 8 shows that interactive collaboration plane 702 has increased in length to represent an increase in the amount of elapsed time of the conference session from 29 seconds to 52 seconds. As shown in FIG. 8, as time progresses, interactive collaboration plane 702 may extend beyond the viewable space of GUI 700. Hence, as will be described in more detail below, a viewer of GUI 700 may scroll or otherwise reposition interactive collaboration plane 702 in either horizontal direction in order to view a portion of interaction collaboration plane 702 that corresponds to a desired time period.

Returning to FIG. 6, in step 604, a plurality of participation events each performed by one of a plurality of participants during a conference session between the participants are automatically detected. The participation events may be automatically detected by detection facility 102. A number of different participation events that may be detected by detection facility 102 will now be described. It will be recognized that the participation events described herein are merely illustrative of the many different participation events that may be detected by detection facility 102.

In some examples, at least one of the participation events detected by detection facility 102 includes a verbal communication spoken by a participant during a conference session. For example, each time a participant speaks during a conference session, detection facility 102 may detect one or more words spoken by the participant. Detection facility 102 may be further configured to record the detected verbal communication for later playback and associate the verbal communication with the participant. Detection facility 102 may be configured to associate a verbal communication with a participant by recording a participant identification number or other identifier within metadata associated with data representative of the verbal communication. In this manner, as will be described in more detail below, a graphical depiction of the verbal communication may be generated and displayed within interactive collaboration plane 702.

In some examples, at least one of the participation events detected by detection facility 102 includes a providing of an electronic file by a participant during a conference session for access by one or more of the other participants. For example, a particular participant in a conference session may desire to share a document, PowerPoint presentation, or other electronic file with the rest of the participants during a conference session. The participant may share an electronic file with one or more of the other participants in any suitable manner. For example, the participant may upload the electronic file to provider subsystem 202 or to any other location accessible by one or more of the other participants. Uploading of an electronic file may be performed by selecting an option displayed within GUI 700, dragging a graphical object representative of the electronic file onto interactive collaboration plane 702, and/or performing any other suitable uploading action as may serve a particular application.

In some examples, at least one of the participation events detected by detection facility 102 includes a behavioral action performed by one of the participants during a conference session. A number of different behavioral actions of a participant in a conference session may be detected by detection facility 102. For example, detection facility 102 may detect a body movement (e.g., a raising of a hand, a shaking of the head, a rolling of the eyes, a chattering of teeth, etc.), an intonation of voice (e.g., a raised voice, an angry voice, an excited voice, a sad voice, etc.), a facial expression (e.g., an angry expression, an excited expression, a happy expression, a bored expression, etc.), a spontaneous utterance (e.g., "wow!", "I know!", "ah ha!", a swear word, etc.), closed eyes (indicative of sleeping) and/or any other behavioral action performed by one or participants during a conference session. To this end, detection facility 102 may include or utilize one or more motion sensors, cameras, frequency spectrum analyzers, and/or any other detection device configured to detect any of the behavioral actions described herein.

Detection of one or more behavioral actions performed by a participant may facilitate determination of an emotional state of a participant. For example, detection facility 102 may determine that a participant is nervous, excited, upset, bored, etc. based on one or more detected behavioral actions. As will be described in more detail below, a graphical depiction of a detected behavioral action may therefore be useful in monitoring how participants react to one or more participation events that transpire during a conference session.

Additionally or alternatively, detection of one or more behavioral actions performed by a participant may facilitate identification of a noteworthy contribution made by the participant during a conference session. For example, detection facility 102 may detect a spontaneous utterance of "I know!" by a participant. A representative graphical depiction (e.g., a light bulb or the like) may be displayed within interactive collaboration plane 702 to signify that a subsequent verbal communication or other type or participation event performed by the participant is likely to include something noteworthy or important (e.g., a new idea).

In some examples, at least one of the participation events detected by detection facility 102 may include an inputting of a text note by a participant during a conference session for display within interactive collaboration plane 702. For example, a participant may desire to create a text note during the conference session for one or more of the other participants to see. Accordingly, the user may input the text note by typing, writing by hand, or any other input mechanism. Detection facility 102 may detect the creation of the text note so that a graphical depiction of the text note may be displayed within interactive collaboration plane 702 and accessed by one or more participants.

In some examples, at least one of the participation events detected by detection facility 102 may include an inputting of a drawing or other annotation made by hand by a participant during a conference session for display within interactive collaboration plane 702. For example, a participant may desire to create a drawing by hand during the conference session for one or more of the other participants to see. Accordingly, the user may input the drawing by using a drawing tablet, touch screen, or the like. Detection facility 102 may detect the creation of the drawing so that a graphical depiction of the drawing may be displayed within interactive collaboration plane 702 and accessed by one or more participants. Detection facility 102 may detect the creation of the drawing in any suitable manner. For example, detection facility 102 may capture the drawing in response to a voice command performed by a participant.

In step 606, a time of occurrence of each of the participation events detected by detection facility 102 is recorded. In some examples, detection facility 102 is configured to record these times of occurrences. For example, detection facility 102 may record a timestamp within metadata associated with each participation event. In this manner, as will be described in more detail below, a graphical depiction of a participation event may be positioned within interactive collaboration plane 702 at a location corresponding to a time of occurrence of the participation event.

In step 608, graphical depictions of the participation events are displayed within the interactive collaboration plane. The graphical depictions may be displayed by display facility 104 and may be positioned along time access 706 in accordance with the recorded times of occurrence of the participation events detected by detection facility 102.

Exemplary graphical depictions of participation events will now be described. It will be recognized that the graphical depictions described herein are merely illustrative of the many different graphical depictions that may be associated with and/or used to represent one or more participation events detected by detection facility 102.

Figure 9:
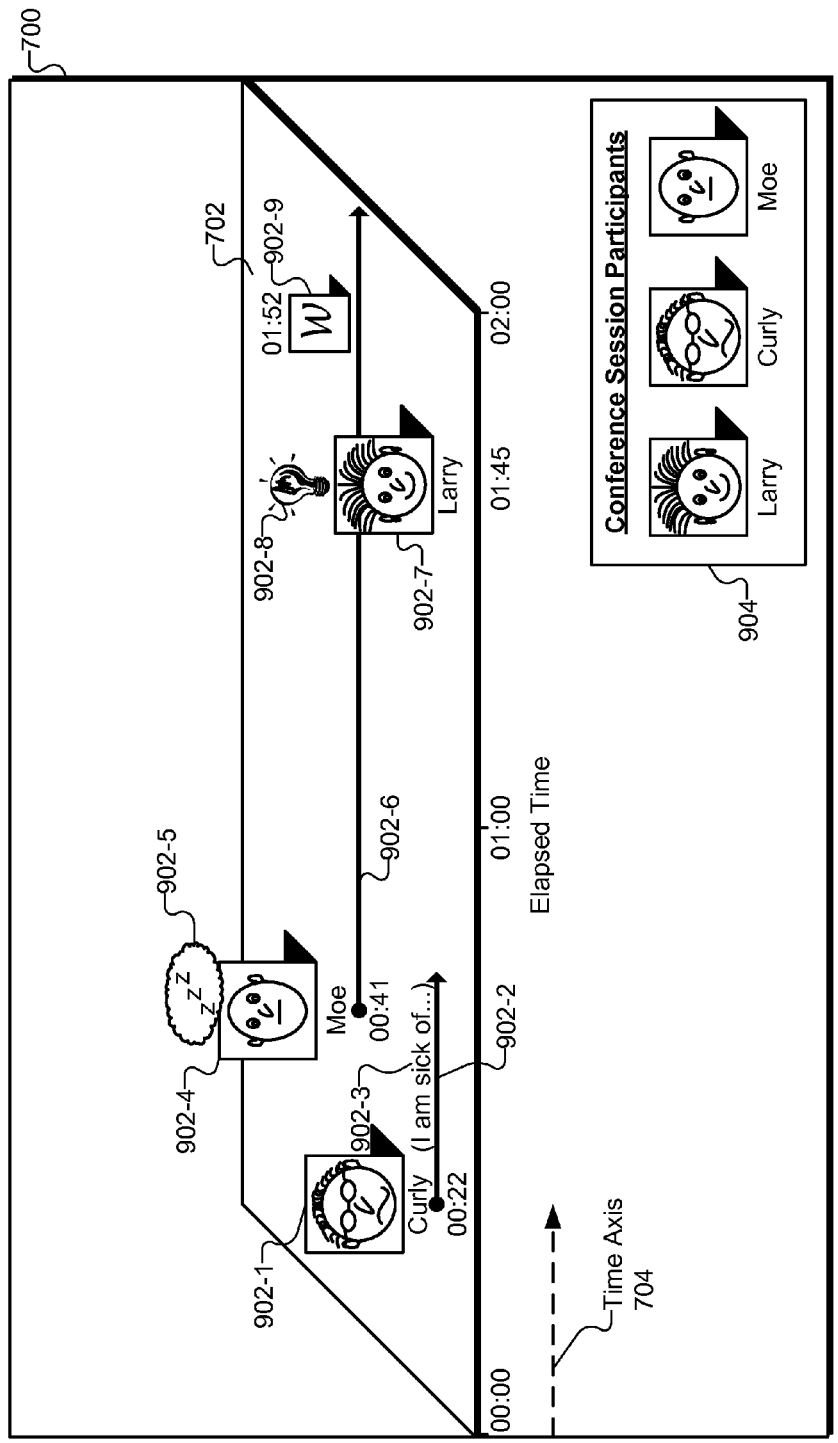
FIG. 9 illustrates an exemplary GUI wherein an interactive collaboration plane associated with a particular conference session is displayed according to principles described herein.

FIG. 9 illustrates an exemplary GUI 700 wherein an interactive collaboration plane 702 associated with a particular conference session is displayed. GUI 700 may be presented to one or more participants or other users (e.g., supervisors, etc.) in real-time as a conference session (e.g., a telephone conference session and/or a video conference session) occurs. Additionally or alternatively, GUI 700 may be presented to one or more participants or other users after a conference session (e.g., an in-person meeting) has occurred. It will be assumed in the examples herein that GUI 700 is presented to one or more participants or other users in real-time as a conference session occurs for illustrative purposes only.

As shown in FIG. 9, graphical depictions of a plurality of participation events performed by one or more participants in a conference session are displayed within the interactive collaboration plane 702. Each graphical depiction may include one or more graphical objects 902 (e.g., graphical objects 902-1 through 902-9) representative of a corresponding participation event and may be positioned along time axis 704 in accordance with a recorded time of occurrence of the corresponding participation event. Graphical objects 902 that may be used to represent participation events may include, but are not limited to, pictures of participants associated with the participation events, text, arrows, clipart representative of behavioral actions (e.g., light bulbs, exclamation marks, snooze clouds, etc.), and/or any other graphics as may serve a particular application.

To illustrate, graphical objects 902-1, 902-2, and 902-3 make up a graphical depiction of a verbal communication spoken by a participant named "Curly." Graphical object 902-1 includes a picture of Curly and is positioned along time axis 704 at a start time (e.g., 00:22) of the verbal communication. Graphical object 902-2 includes an arrow having a length representative of a duration of the verbal communication and is positioned along time axis 704 accordingly.

As shown in FIG. 9, graphical object 902-3 includes text representative of the verbal communication and is positioned along time axis 704 at a location corresponding to the time of occurrence of the verbal communication. The text may include at least one transcribed word of the verbal communication, for example. To this end, detection facility 102 or any other facility within system 100 may be configured to transcribe at least a portion of a detected verbal communication so that display facility 102 may display text representative thereof within interactive collaboration plane 702. The detected verbal communication may be transcribed using any suitable transcription or speech recognition heuristic as may serve a particular application.

As shown in FIG. 9, graphical objects 902-4, 902-5, and 902-6 make up a graphical depiction of a participation event associated with a time period during which a participant named "Moe" is sleeping. This graphical depiction may be based on a detected behavioral action indicative of sleep (e.g., closed eyes, etc.). Graphical object 902-4 includes a picture of Moe and is positioned along time axis 704 at a time (e.g., 00:41) at which Moe fell asleep. Graphical object 902-5 includes a "sleep cloud" graphic configured to graphically represent that Moe has fallen asleep. Graphical object 902-6 includes an arrow having a length representative of how long Moe stays asleep during the conference session and is positioned along time axis 704 accordingly.

Graphical objects 902-7 and 902-8 make up a graphical depiction of a behavioral action wherein a participant named "Larry" spontaneously utters something (e.g., "I know!") that indicates that he has come up with a new idea. Graphical object 902-7 includes a picture of Larry and is positioned along time axis 704 at a time (e.g., 01:45) corresponding to the utterance. Graphical object 902-8 includes a "light bulb" graphic configured to graphically represent the new idea.

Graphical object 902-9 makes up a graphical depiction of an electronic file (e.g., a Word document) provided by one of the participants for access by one or more of the participants. Graphical object 902-9 is located within interactive collaboration plane 702 at a position corresponding to a time (e.g., 01:52) at which the electronic file was provided and may include any graphic representative of the electronic file as may serve a particular application.

As shown in FIG. 9, information in addition to graphical objects 902 and related to one or more of the participation events may be displayed within interactive collaboration plane 702. For example, the name of each participant associated with the participation events, a timestamp, and/or other information may be displayed along with graphical objects 902 within interactive collaboration plane 702. Additionally or alternatively, graphical depictions of each of the participants in the conference session may be displayed within a "conference session participants" window 904. The amount and type of additional information presented to a viewer of GUI 700 may be dynamically adjusted based on the size of GUI 700, the number of graphical depictions displayed within interactive collaboration plane 702, and/or any other factor as may serve a particular application.

In some examples, a graphical object 902 displayed within interactive collaboration plane 702 may be selected by a viewer of GUI 700 to access additional information corresponding to a participation event associated with the graphical object 902. A graphical object 902 may be selected in any suitable manner as may serve a particular application. For example, a user may position a mouse pointer (e.g., mouse over) over a desired graphical object such as graphical object 902-1, double click graphical object 902-1, and/or perform any other suitable selection technique to select graphical object 902-1.

Figure 10:
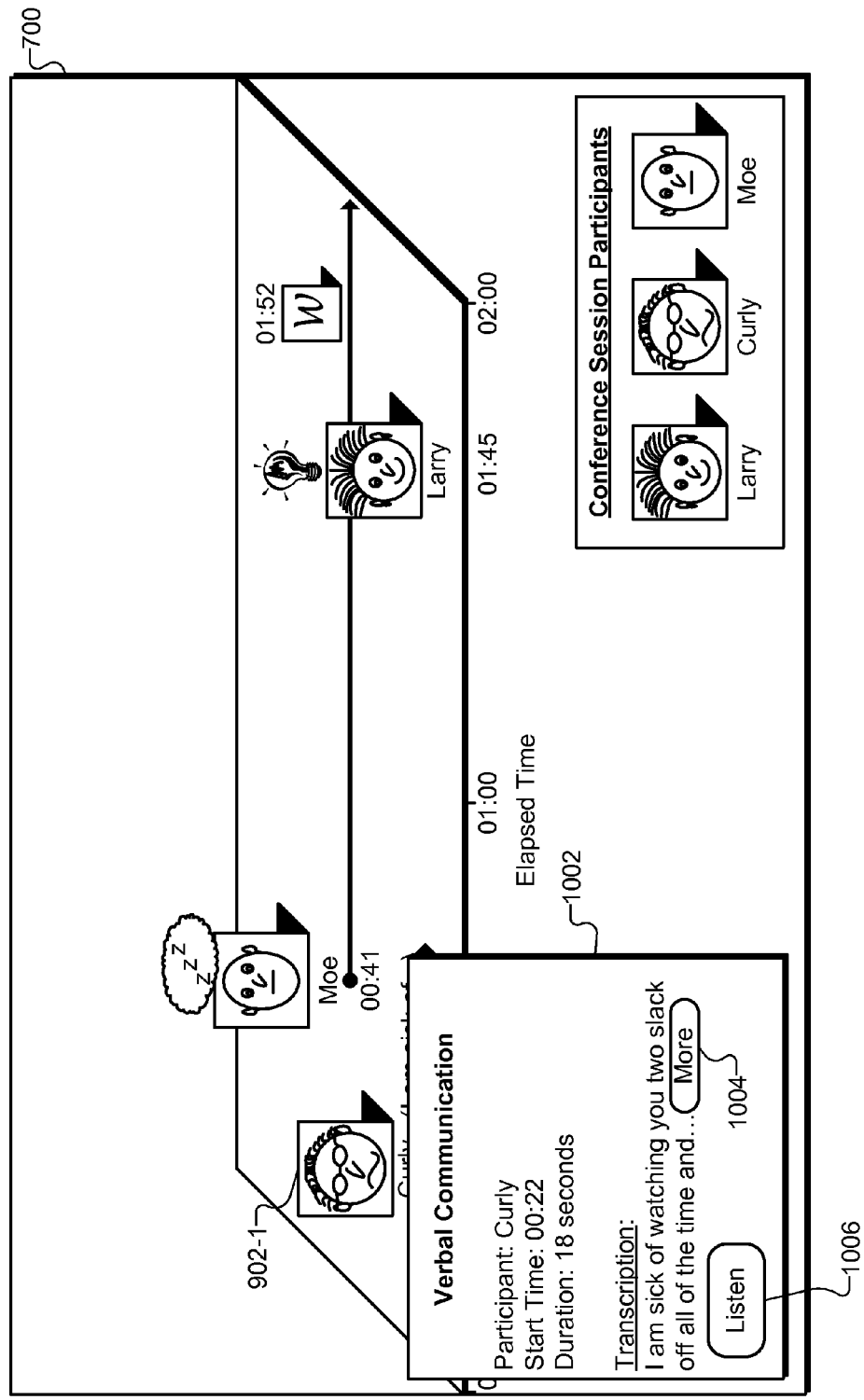
FIG. 10 illustrates an exemplary pop-up window that may be displayed within a GUI in response to a viewer selection of a graphical object according to principles described herein.

FIG. 10 illustrates an exemplary pop-up window 1002 that may be displayed within GUI 700 in response to a viewer selection of graphical object 902-1. Pop-up window 1002 may be configured to display additional information corresponding to the participation event associated with graphical object 902-1. For example, as shown in FIG. 10, statistics associated with the verbal communication represented by graphical object 902-1 are displayed within pop-up window 1002. A transcription of at least a portion of the verbal communication may additionally or alternatively be included within pop-up window 1002 along with an option 1004 to access a transcription of the entire verbal communication.

In some examples, as shown in FIG. 10, pop-up window 1002 may include a selectable option 1006 to listen to a recording of the verbal communication. To this end, detection facility 102 and/or any other component of system 100 may be configured to record the verbal communication for playback in response to a viewer selection of option 1006 and/or one or more of the graphical objects 902. The recording may include an audio and/or video recording as may serve a particular application. Accordingly, an option to view a video recording of the participant speaking the verbal communication may additionally or alternatively be presented to a viewer within pop-up window 1002.

Figure 11:
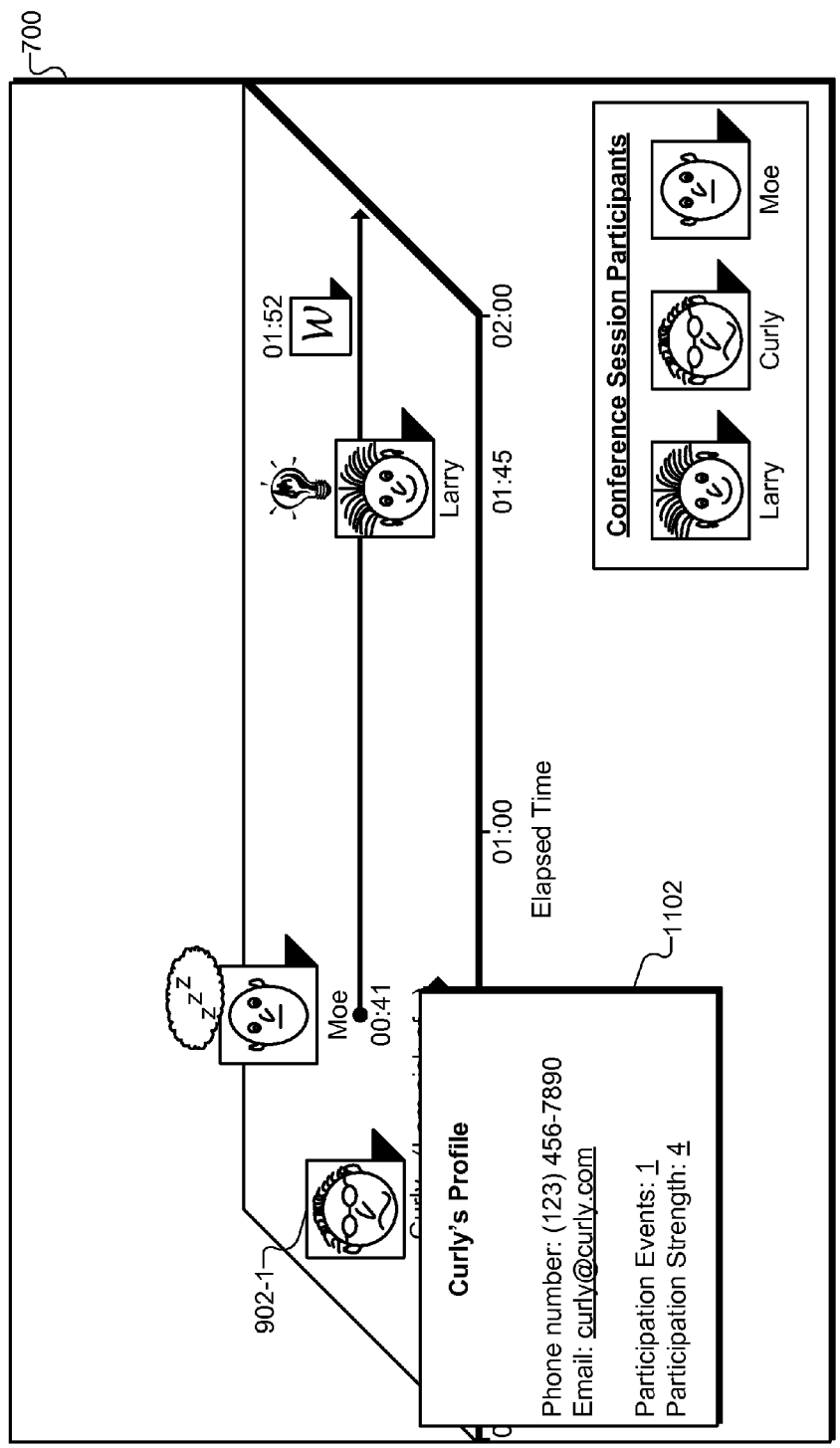
FIG. 11 illustrates another pop-up window that may be displayed within a GUI in response to a viewer selection of a graphical object according to principles described herein.

FIG. 11 illustrates an additional or alternative pop-up window 1102 that may be displayed within GUI 700 in response to a viewer selection of graphical object 902-1. As shown in FIG. 11, pop-up window 1102 may be configured to display profile information corresponding to the participant associated with graphical object 902-1 (i.e., Curly). Profile information may be represented by user profile data 116 and may include contact information corresponding to the participant (e.g., a phone number and/or email address of the participant), participation information corresponding to the participant (e.g., a total number of participation events associated with the participant and a participation strength metric configured to represent an overall participation level of the participant in the conference session), and/or any other statistic associated with the participation of the participant in the conference session.

Figure 12:
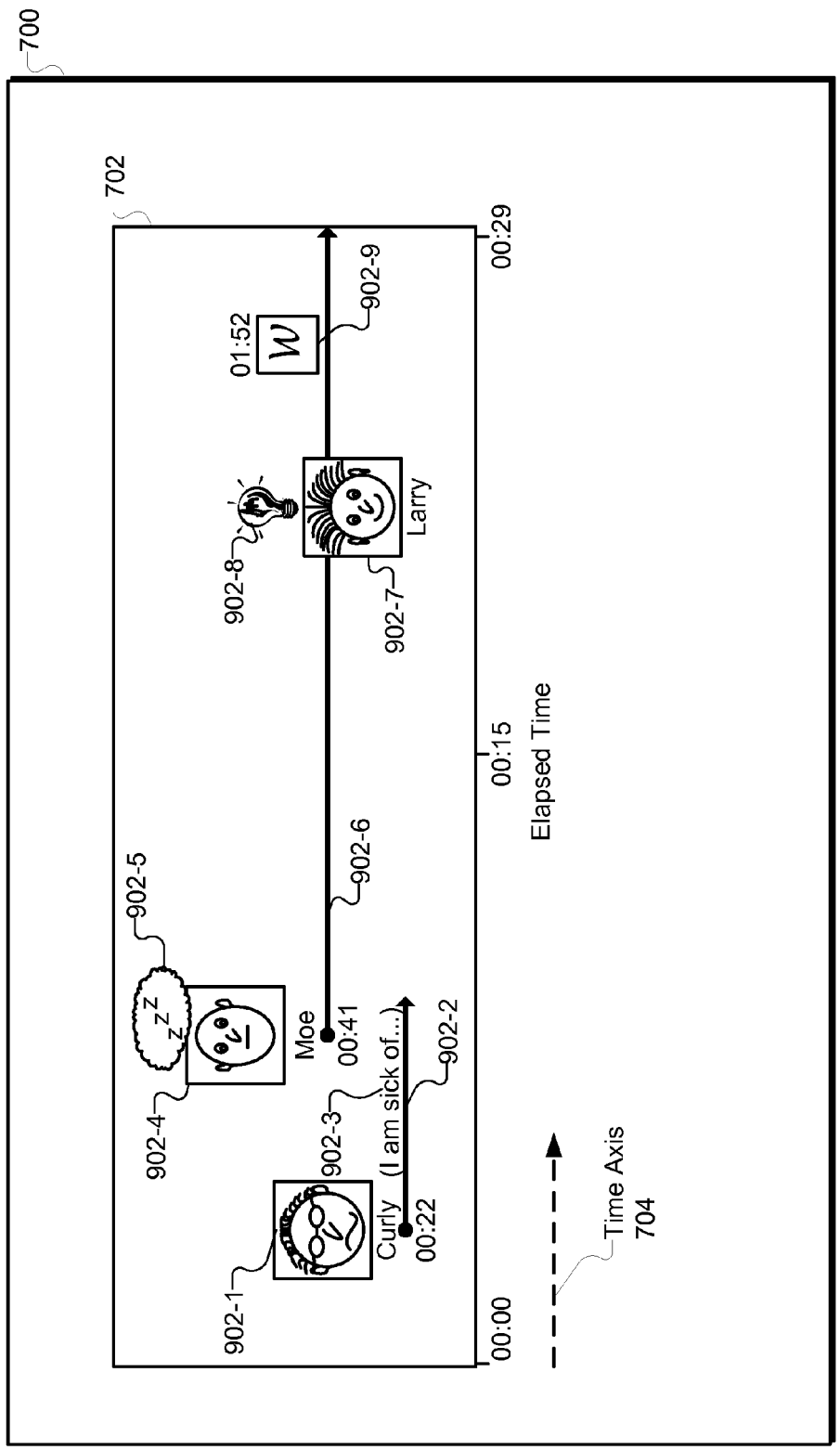
FIG. 12 shows an interactive collaboration plane after it has been transitioned from a three-dimensional view into a two-dimensional view according to principles described herein.

As mentioned, interactive collaboration plane 702 may be displayed in a three-dimensional view. In some examples, a viewer of GUI 700 may desire to see the interactive collaboration plane 702 in a two-dimensional view. For example, it may be more intuitive for the viewer to interact with interactive collaboration plane 702 when interactive collaboration plane 702 is displayed in a two-dimensional view. To this end, display facility 104 may be configured to transition interactive collaboration plane 702 from a three-dimensional view into a two-dimensional view in response to a viewer input command. To illustrate, FIG. 12 shows interactive collaboration plane 702 after it has been transitioned from the three-dimensional view shown in FIG. 9 into a two-dimensional view. As shown in FIG. 12, the graphical objects 902 displayed within interactive collaboration plane 702 are two-dimensional.

Figure 13:
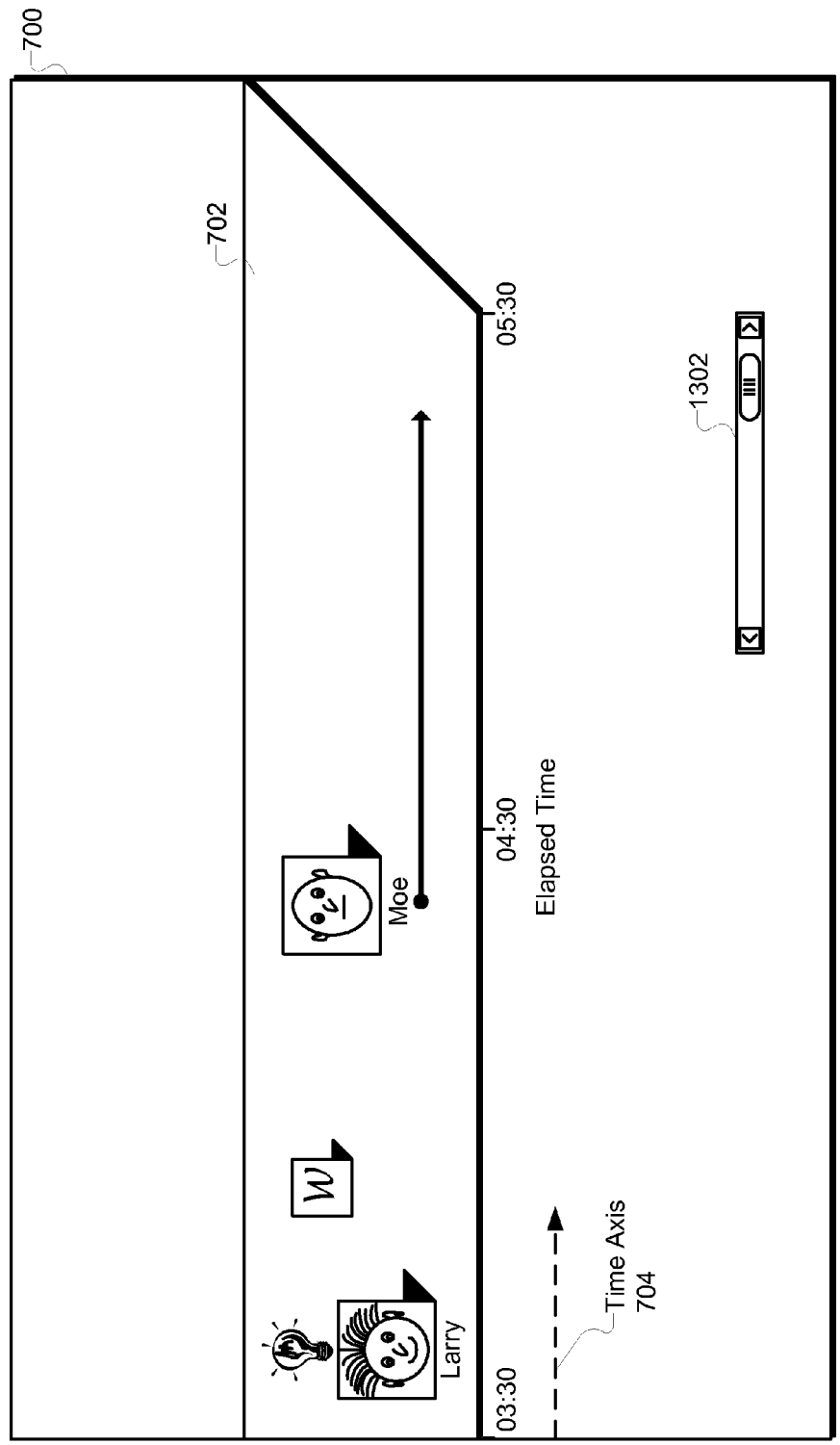
FIGS. 13-14 illustrate how an interactive collaboration plane may be scrolled in a horizontal direction according to principles described herein.

As mentioned, a viewer of GUI 700 may view a portion of interactive collaboration plane 702 that corresponds to a desired time period to view graphical depictions of the participation events that occurred during that time period. For example, FIG. 13 shows interactive collaboration plane 702 after 5 minutes and 30 seconds of a conference session have elapsed. As shown in FIG. 13, graphical depictions of participation events that occurred during only the last two minutes of the conference session are shown within interactive collaboration plane 702.

Figure 14:
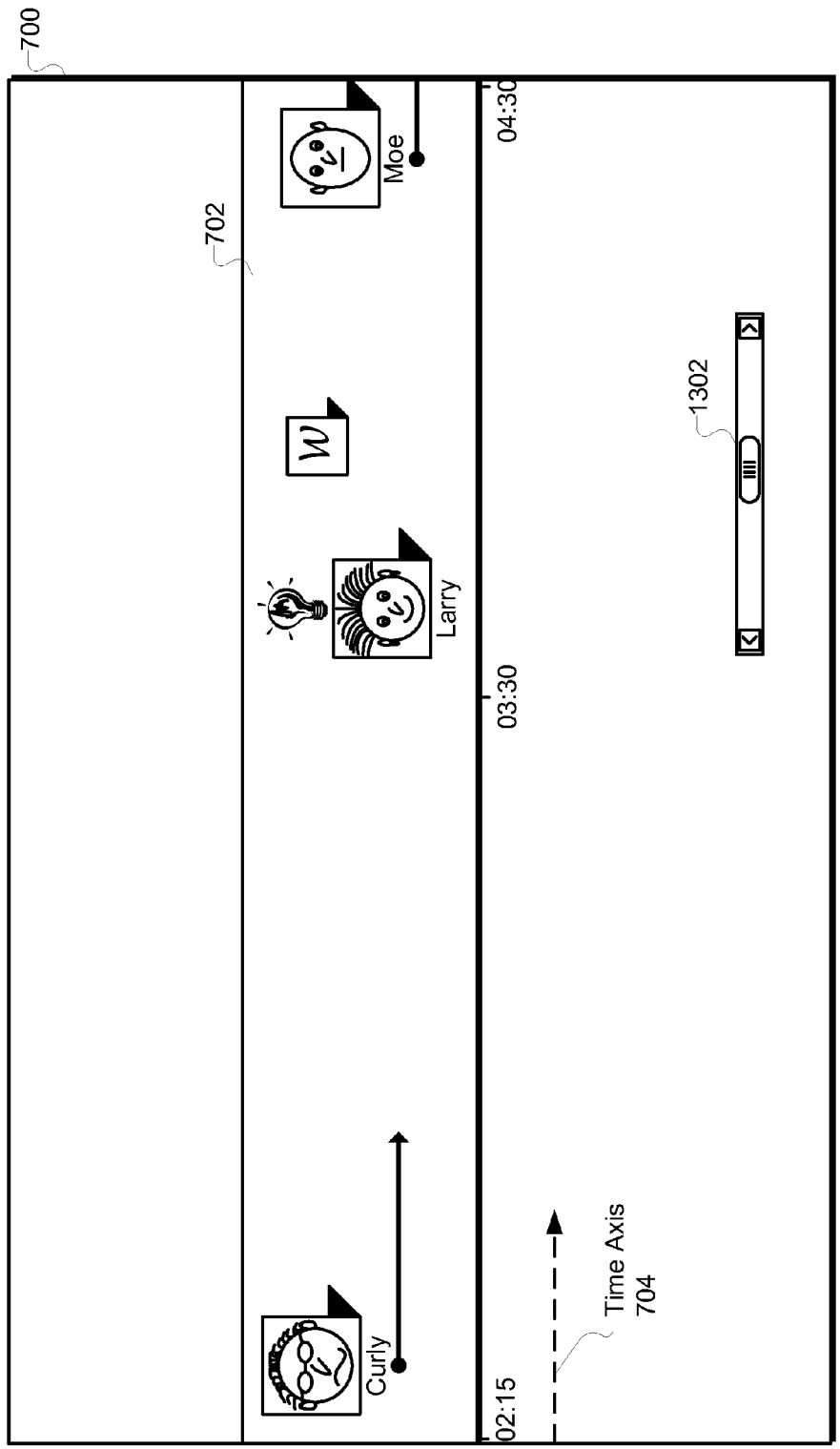

However, a viewer of GUI 700 may desire to view graphical depictions of participation events that occurred before the last two minutes of the conference session. To this end, a scrollbar 1302 may be displayed within GUI 700 that allows a viewer to scroll interactive collaboration plane 702 horizontally within GUI 700. In this manner, a viewer may reposition interactive collaboration plane 702 to display one or more desired graphical depictions of interaction events in GUI 700. For example, FIG. 14 shows GUI 700 after interactive collaboration plane 702 has been scrolled to the left to display graphical depictions of participation events having times of occurrence between times 02:15 and 04:30.

Additional and/or alternative tools for scrolling interactive collaboration plane 702 within GUI 700 may be provided as may serve a particular application. For example, a viewer may select interactive collaboration plane 702 with a mouse pointer or the like and drag interactive collaboration plane 702 in a desired direction.

In some examples, interactive collaboration plane 702 is displayed concurrently on a plurality of access devices 504 each accessible by at least one of the participants of a conference session. In this manner, each of the participants may interact with interactive collaboration plane 702 during a conference session between the participants.

Additionally or alternatively, interactive collaboration plane 702 may be displayed on an access device 504 accessible by a user who is not a participant in the conference session. For example, a supervisor, family member, or other user associated with one or more of the participants may view interactive collaboration plane in order to supervise, review, and/or otherwise view participation events performed by one or more of the participants.

Additional or alternative graphical depictions to those described herein may be displayed within interactive collaboration plane 702 as may serve a particular application. For example, a graphical depiction of one or more communications (e.g., SMS, MMS, and/or email messages) between participants of a conference session may be displayed within interactive collaboration plane 702 or within any other portion of GUI 700.

Figure 15:
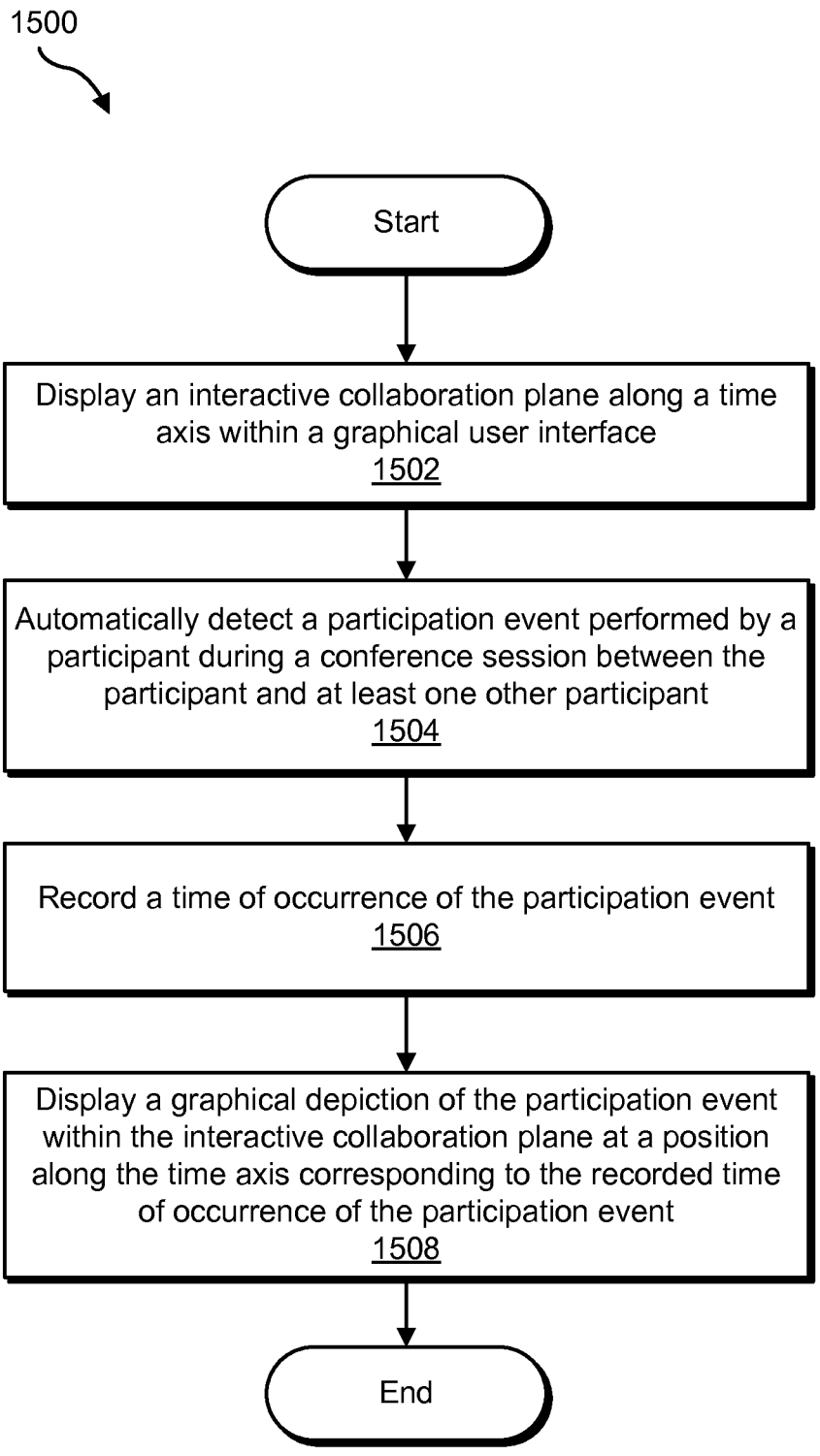
FIG. 15 illustrates another exemplary method of visually chronicling a conference session according to principles described herein.

FIG. 15 illustrates another exemplary method 1500 of visually chronicling a conference session. While FIG. 15 illustrates exemplary steps according to one embodiment, other embodiments may omit, add to, reorder, and/or modify any of the steps shown in FIG. 15.

In step 1502, an interactive collaboration plane is displayed along a time axis within a graphical user interface. The interactive collaboration plane may be displayed in any of the ways described herein.

In step 1504, a participation event performed by a participant during a conference session between the participant and participants is automatically detected. The participation event may be automatically detected in any of the ways described herein.

In step 1506, a time of occurrence of the participation event is recorded. The time of occurrence may be recorded in any of the ways described herein.

In step 1508, a graphical depiction of the participation event is displayed within the interactive collaboration plane at a position along the time axis corresponding to the recorded time of occurrence of the participation event. The graphical depiction may include any number of graphical objects and may be displayed in any of the ways described herein. Steps 1504-1508 may be repeated for another participation event.

As detailed above, the methods and systems described herein may facilitate visual chronicling of a conference session. As an example, an exemplary method includes displaying an interactive collaboration plane along a time axis within a graphical user interface, automatically detecting a plurality of participation events each performed by one of a plurality of participants during a conference session between the plurality of participants, recording a time of occurrence of each of the participation events, and displaying graphical depictions of the participation events within the interactive collaboration plane. The graphical depictions are positioned along the time axis in accordance with the recorded times of occurrence of the participation events.

Another exemplary method includes displaying an interactive collaboration plane along a time axis within a graphical user interface, automatically detecting a participation event performed by a participant during a conference session between the participant and at least one other participant, recording a time of occurrence of the participation event, and displaying a graphical depiction of the participation event within the interactive collaboration plane at a position along the time axis corresponding to the recorded time of occurrence of the participation event.

An exemplary system includes a detection facility configured to automatically detect a plurality of participation events each performed by one of a plurality of participants during a conference session between the plurality of participants and record a time of occurrence of each of the participation events. The system may further include a display facility selectively and communicatively coupled to the detection facility and configured to display an interactive collaboration plane along a time axis within a graphical user interface, display graphical depictions of the participation events within the interactive collaboration plane, and position the graphical depictions along the time axis in accordance with the recorded times of occurrence of the participation events.

In the preceding description, various exemplary embodiments have been described with reference to the accompanying drawings. It will, however, be evident that various modifications and changes may be made thereto, and additional embodiments may be implemented, without departing from the scope of the invention as set forth in the claims that follow. For example, certain features of one embodiment described herein may be combined with or substituted for features of another embodiment described herein. The description and drawings are accordingly to be regarded in an illustrative rather than a restrictive sense.

What is claimed is:

1. A method comprising:
    displaying, by at least one computing device, an interactive collaboration plane along a time axis within a graphical user interface;
    automatically detecting, by the least one computing device, a plurality of participation events performed by a plurality of participants during a real-time conference session between the plurality of participants, the real-time conference session including real-time voice communications between the plurality of participants, wherein the automatically detecting of the plurality of participation events comprises automatically detecting a plurality of verbal communications spoken by the plurality of participants during the real time conference session;
    associating, by the least one computing device, the plurality of verbal communications with the plurality of participants;
    recording, by the least one computing device, a time of occurrence of each of the participation events; and
    displaying, by the least one computing device, graphical depictions of the participation events within the interactive collaboration plane by including, within the interactive collaboration pane, pictures of the participants associated with the verbal communications and a plurality of arrows each having a length representative of a duration of one of the verbal communications;
    wherein the graphical depictions are positioned along the time axis in accordance with the recorded times of occurrence of the participation events.

2. The method of claim 1, wherein the graphical depictions are configured to visually chronicle the real-time conference session.

3. The method of claim 1, wherein:
    the automatically detecting comprises
        detecting a first verbal communication spoken by a first participant within the plurality of participants; and
        detecting a second verbal communication spoken by a second participant within the plurality of participants; and
    the displaying comprises
        displaying, within the interactive collaboration pane at a first location corresponding to a recorded time of the first verbal communication, a first picture of the first participant and a first arrow having a length representative of a duration of the first verbal communication, and
        displaying, within the interactive collaboration pane at a second location corresponding to a recorded time of the second verbal communication, a second picture of the second participant and a second arrow having a length representative of a duration of the second verbal communication.

4. The method of claim 1, further comprising transcribing at least one word included within the plurality of verbal communications, and displaying a depiction of the at least one word within the interactive collaboration pane.

5. The method of claim 1, wherein at least one of the plurality of participation events comprises a providing of an electronic file by one of the plurality of participants for access by one or more of the plurality of participants.

6. The method of claim 5, wherein the displaying of the graphical depictions comprises displaying a graphical object representative of the electronic file within the interactive collaboration plane.

7. The method of claim 1, wherein at least one of the plurality of participation events comprises a behavioral action performed by one of the plurality of participants.

8. The method of claim 1, wherein at least one of the plurality of participation events comprises an inputting of a text note by one of the plurality of participants, and wherein the displaying of the graphical depictions comprises displaying a graphical object representative of the text note within the interactive collaboration plane.

9. The method of claim 1, wherein one or more of the graphical depictions comprises one or more selectable graphical objects, wherein each of the selectable graphical objects is configured to provide access to additional information associated with one or more of the participation events when selected.

10. The method of claim 1, wherein the displaying of the interactive collaboration plane comprises displaying the interactive collaboration plane in a three-dimensional view, and wherein the method further comprises transitioning the interactive collaboration plane from the three-dimensional view into a two-dimensional view in response to a viewer input command.

11. The method of claim 1, further comprising displaying the graphical depictions within the collaboration plane in real-time as the participation events occur during the real-time conference session.

12. The method of claim 1, further comprising recording one or more of the participation events for playback in response to a viewer selection of one or more of the graphical depictions.

13. The method of claim 1, further comprising concurrently displaying the interactive collaboration plane on a plurality of real-time conference session access devices each accessible by at least one of the plurality of participants.

14. The method of claim 1, wherein the graphical depictions each comprise at least one graphical object representative of one of the participation events.

15. A system comprising:
  at least one computing device including a processor and comprising:
    a detection facility that directs the processor to
      automatically detect a plurality of participation events each performed by one of a plurality of participants during a real-time conference session between the plurality of participants, the real-time conference session including real-time voice communications between the plurality of participants, wherein the detection facility is configured to automatically detect the plurality of participation events by automatically detecting a plurality of verbal communications spoken by the plurality of participants during the real-time conference session;
      associate the plurality of verbal communications with the plurality of participants, and
      record a time of occurrence of each of the participation events; and
    a display facility selectively and communicatively coupled to the detection facility and that directs the processor to
      display an interactive collaboration plane along a time axis within a graphical user interface,
      display graphical depictions of the participation events within the interactive collaboration plane by including, within the interactive collaboration pane, pictures of the participants associated with the verbal communications and a plurality of arrows each having a length representative of a duration of one of the verbal communications, and
      position the graphical depictions along the time axis in accordance with the recorded times of occurrence of the participation events.

16. The system of claim 15, wherein at least one of the plurality of participation events comprises a behavioral action performed by one of the plurality of participants.

17. The system of claim 15, wherein:
  the detection facility directs the processor to automatically detect the plurality of participation events by
    detecting a first verbal communication spoken by a first participant within the plurality of participants, and
    detecting a second verbal communication spoken by a second participant within the plurality of participants; and
  the display facility directs the processor to display the graphical depictions by
    displaying, within the interactive collaboration pane at a first location corresponding to a recorded time of the first verbal communication, a first picture of the first participant and a first arrow having a length representative of a duration of the first verbal communication, and
    displaying, within the interactive collaboration pane at a second location corresponding to a recorded time of the second verbal communication, a second picture of the second participant and a second arrow having a length representative of a duration of the second verbal communication.

* * * * *